June 12, 1962 — T. H. DEXTER — 3,038,782
PRODUCTION OF SODIUM PERCHLORATE
Filed Dec. 21, 1953
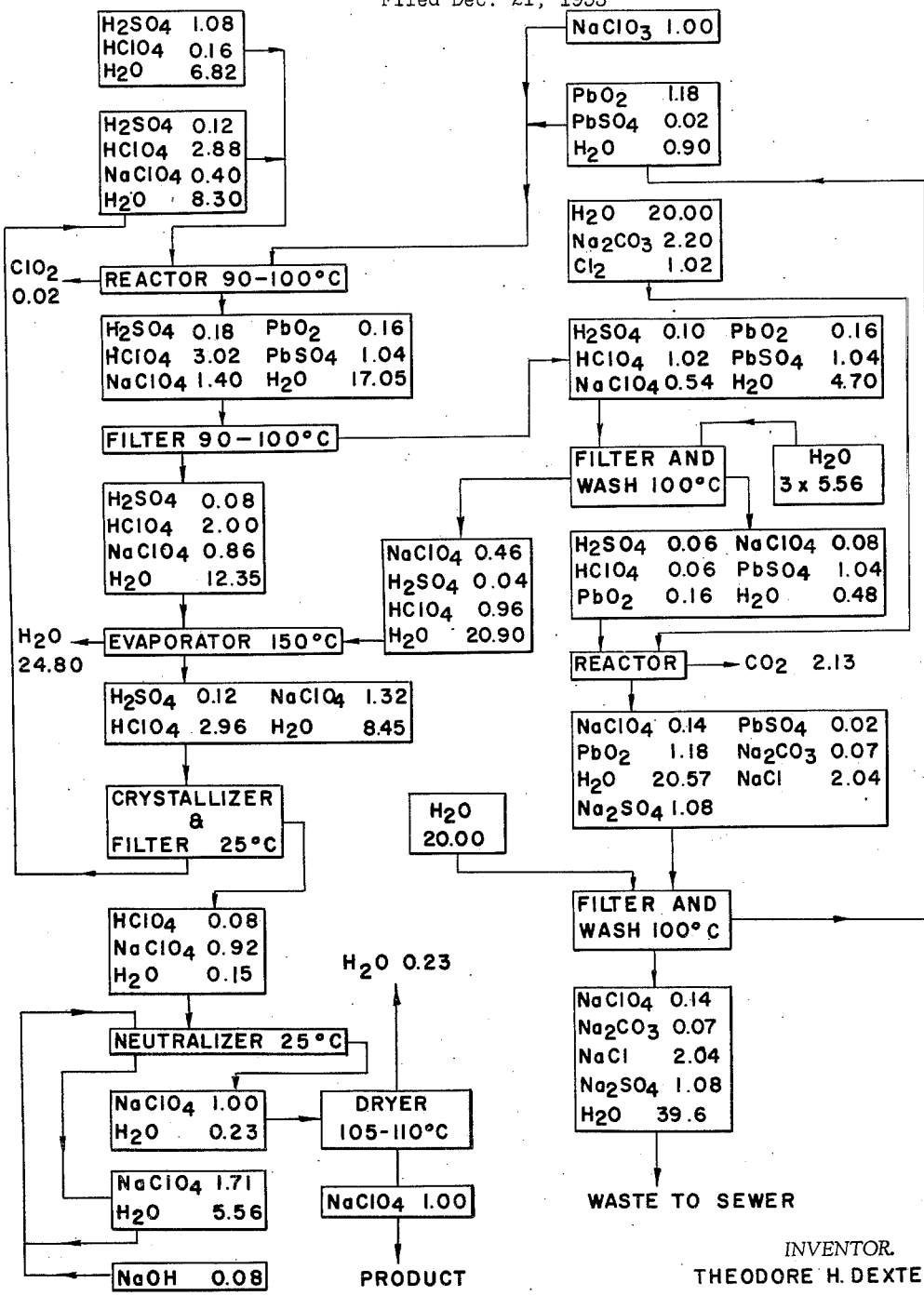
INVENTOR.
THEODORE H. DEXTER 3,038,782
PRODUCTION OF SODIUM PERCHLORATE
Theodore H. Dexter, Niagara Falls, N.Y., assignor to Olin Mathieson Chemical Corporation, a corporation of Virginia
Filed Dec. 21, 1953, Ser. No. 399,607
2 Claims. (Cl. 23—85)

My invention relates to a process for the production of sodium perchlorate by the oxidation of sodium chlorate using lead dioxide in a reaction medium containing sulfuric acid.

It is known to convert chlorates to perchlorates using lead dioxide and sulfuric acid. When the chlorate chosen is sodium chlorate, the reaction is as follows:

(1) $PbO_2 + NaClO_3 + H_2SO_4 = PbSO_4 + NaClO_4 + H_2O$

This is shown, for example, in application Serial No. 331,738, filed January 16, 1953, by Daniel J. Jaszka and me, now U.S. Patent 2,853,362. Thus, that application describes the reaction of alkali metal and alkaline earth metal chlorates, preferably the stoichiometric amount of lead dioxide and preferably about 1.5 or 2 to about 6 moles of sulfuric acid per mole of lead dioxide, to form the corresponding alkali metal or alkaline earth metal perchlorate at reaction temperatures preferably of about 90° to about 120° C.

When this process is utilized for converting sodium chlorate to sodium perchlorate, it is found that difficulty is encountered in separating the sodium perchlorate produced from the reaction mixture. Specifically, upon completion of the oxidation reaction it is found that, due to its high viscosity, the reaction mixture is difficult to filter to provide a filtrate containing sodium perchlorate dissolved therein, and also that, because of the sigh solubility of the sodium perchlorate in the filtrate, it is difficult to separate the sodium perchlorate therefrom in solid form.

In accordance with my present invention, I have discovered that these difficulties can be conveniently overcome by including in the reaction mixture as an initial ingredient at least a molar amount of perchloric acid, based upon the moles of sodium chlorate present. When this is done, the reaction mixture at the end of the reaction period has a viscosity such that it can be conveniently filtered to provide a filtrate in which the sodium perchlorate is relatively insoluble, so that it can be conveniently separated therefrom as a solid. The oxidation can be carried out in about one hour with low cost equipment to produce sodium perchlorate in yields as high as about 98 percent, based upon sodium chlorate and on lead dioxide. The sodium perchlorate produced is free from undesirable impurities, such as lead, chlorate, chloride and sulfate ions.

The following examples illustrate in detail the practice of my invention.

EXAMPLE I

A mixture consisting of 34.1 grams $H_2SO_4$ (96%), 149.8 grams $HClO_4$ (60%), 65.2 grams $H_2O$, 71.8 grams $PbO_2$ and 32.0 grams $NaClO_3$ is reacted in a three neck flask with constant agitation for two hours at 100° C. A $CaO_2$ trap is employed in the system to collect any gases formed. The reaction mixture is immediately filtered hot and the residue washed to remove adhering $NaClO_4$, $HClO_4$ and $H_2SO_4$. The filtrate and washing are combined and analyzed for $ClO_3^-$ ions and $ClO_4^-$ ions. The solution from the trap is also analyzed to determine whether any $NaClO_3$ was lost as $ClO_2$. The analysis shows that a 90% yield of $NaClO_4$ is obtained with only an 0.8% loss of $NaClO_3$ as $ClO_2$. Evaporation and cooling of the combined filtrate and washing results in the precipitation of sodium perchlorate crystals.

EXAMPLE II

A mixture consisting of 68.2 grams $H_2SO_4$ (96%), 300 grams $HClO_4$ (60%), 130.4 grams $H_2O$, 143.6 grams $PbO_2$ and 64.0 grams $NaClO_3$ is reacted at 98° C. in a three neck flask with constant agitation. A $CaO_2$ trap is employed to collect any gases formed. To check the rate of reaction small samples are removed at definite time intervals throughout the run. Analysis shows that after 2.33 hours an 82% yield of $NaClO_4$ is obtained with only a 0.1% loss of $NaClO_3$ as $ClO_2$. The reaction mixture is filtered hot. Evaporation and cooling of the filtrate results in the production of sodium perchlorate crystals.

EXAMPLE III

A mixture consisting of 58.8 grams $H_2SO_4$, 151.0 grams $HClO_4$, 132.4 grams $H_2O$, 143.5 grams $PbO_2$, 20.8 grams $NaClO_4$ and 54.0 grams $NaClO_3$ is reacted in a three neck flask with constant agitation for ¾ hour at 98–100° C. A $CaO_2$ trap is employed to collect any gases formed. The reaction mixture is filtered and the residue washed with $H_2O$ to remove adhering $NaClO_4$, $HClO_4$ and $H_2SO_4$. The filtrate and washings are analyzed for $ClO_3^-$ ion and $ClO_4^-$ ion indicating a 100% yield of $NaClO_4$. Analysis of the trap solution showed that no $NaClO_3$ is lost as $ClO_2$. Evaporation and cooling of the combined filtrate and washing results in the precipitation of sodium perchlorate crystals.

EXAMPLE IV

In order to test my process further, a series of seven cycles was run, in five of which the process liquor was recycled. Stoichiomteric quantities of $PbO_2$, $H_2SO_4$ and $NaClO_3$ were used in the first five cycles, resulting in incomplete conversion of the $NaClO_3$. In cycles six and seven, a 20% excess of $PbO_2$ and $H_2SO_4$ was added. Complete conversion of $NaClO_3$ was obtained in these two runs. The cyclic operation of the process was carried out as follows.

A charge consisting of 0.5 gram mole 60% $H_2SO_4$ and 1.5 gram moles 60% $HClO_4$ was placed into a 1 liter resin kettle, fitted with a stirrer (Teflon blade), reflux condenser, and thermometer well. While the mixed acids were still cold, 0.5 gram mole $NaClO_3$ and 0.5 gram mole $PbO_2$ were added. The reactor was set in an oil thermostat at room temperature. Heat was applied, and the temperature of the bath was gradually increased to 110° C.; at the end of 2.5 hours heating time, the reactor was removed from the bath, and the contents transferred to a heated medium porosity, sintered glass funnel, and filtered by vacuum to separate the lead salts from the mother liquor. The lead residue was pressed down with a flat stirring rod. When no more liquor could be removed, the lead residue was slurried with three, fifty ml. portions of hot water, while still on the filter. The washings were added to the original filtrate and the total volume was measured. A small sample (2 ml.) was removed for $ClO_3^-$ analysis, and the rest of the liquor was placed on a hot plate to evaporate. Heating at this point was continued until the solution attained a temperature of 140–150° C., after which the solution was allowed to cool. NaClO₄ crystallized upon cooling, starting at a solution temperature of 130° C. The crystals were removed by filtration when the solution temperature reached 25° C. They were pressed down while on the filter, to remove excess liquor.

Samples of both liquor and crystals were made up to volume for analysis. The remainder of the liquor was recycled in all cases except after cycle six. A fresh solution was prepared for cycle seven. Its composition was accurately known, and was approximately the same as that obtained from cycle six. This was done for the purpose of obtaining an accurate material balance. In the last two cycles, the filtrate and wash solutions were stored, and analyzed separately. No evaporation was undertaken, and no crystalline product was isolated. Cycles six and seven showed that a 20% excess (above stoichiometric of PbO₂ and H₂SO₄ aids in complete conversions of the NaClO₃, and that the excess of PbO₂ is recoverable. NaClO₄ crystallized, when the filtrate (after separation of lead salts) was cooled, but a considerable amount of NaClO₄, as well as HClO₄ remained in the lead residue, as was shown by the analysis of the wash liquor obtained in cycles six and seven. Data from the seven cycles are listed in Table I.

A typical flow sheet and a complete material balance are shown in the accompanying drawing wherein the numerical quantities are in moles. The net equation, as may be calculated from the data presented in the drawing is:

(1) $1.00\text{NaClO}_3 + 0.02\text{HClO}_4 + 1.02\text{H}_2\text{SO}_4 + 1.02\text{PbO}_2$
$= 1.00\text{NaClO}_4 + 1.07\text{H}_2\text{O} + 0.02\text{ClO}_2 + 1.02\text{PbSO}_4$ For further details concerning the conversion of lead sulfate to lead dioxide, reference is made to application Serial No. 331,738 mentioned above.

Various modifications can be made in the specific procedures described to provide other embodiments which fall within the scope of my invention, which constitutes an improvement over the heretofore known lead dioxide-sulfuric acid method for converting sodium chlorate to sodium perchlorate. Considerable variation can be made in the amount of lead dioxide and sulfuric acid (100% basis) employed. Preferably I operate in such manner that the amount of lead dioxide taken is at least that which is approximately sufficient to oxidize the sodium chlorate to sodium perchlorate complete and the amount of sulfuric acid (100% basis) employed is at least sufficient to react with all of the lead in the lead dioxide converted, thus converting such lead to lead sulfate. In general lead dioxide is used in the amount of 0.8 to 1.5 moles and sulfuric acid (100% basis) is used in the amount from 0.8 to 2.0 moles, both ranges being based upon one mole of sodium chlorate originally present in the reaction mixture. Considerable variation can also be made in the amount of perchloric acid (100% basis) initially present in the reaction mixture, but in general the amount of perchloric acid (100% basis) which I use is within the range from 2 to 5 moles, based upon one mole of sodium chlorate. In general, the amount of water initially present in the reaction mixture will be within the range of 57 to 77% of the combined weight of the aicds. The reaction temperature which I use does not differ critically from those employed in the process heretofore known, although I prefer to operate in the approximate range 90° to 120° C.

Studies have been made involving the direct substitution of perchloric acid for sulfuric acid in the reaction of lead dioxide with sodium chlorate to produce sodium perchlorate. It was necessary, after reaction, to add sulfuric acid, thus precipitating lead sulfate which was removed by filtration. The equations are:

(2) $2\text{HClO}_4 + \text{PbO}_2 + \text{NaClO}_3 = \text{NaClO}_4 + \text{Pb(ClO}_4)_2 + \text{H}_2\text{O}$ (3) $\text{Pb(ClO}_4)_2 + \text{H}_2\text{SO}_4 = \text{PbSO}_4 + 2\text{HClO}_4$ After removal of the lead sulfate, a solution of sodium perchlorate in perchloric acid remained. In one experiment, 0.3 mole of sodium chlorate, 0.3 mole of lead dioxide and 60 percent by weight aqueous perchloric acid containing 1.2 moles of perchloric acid (100% basis) were reacted at 100° C. for four hours. Upon analysis of the reaction mixture, 1.23 moles of perchlorate were found. This experiment showed that the sodium chlorate was not entirely oxidized to sodium perchlorate, but instead reacted partially with perchloric acid according to the equation:

(4) $2\text{HClO}_4 + 3\text{NaClO}_3 = 3\text{NaClO}_4 + 2\text{ClO}_2 + \text{H}_2\text{O}$ In effect, perchloric acid was lost as chlorine dioxide and water.

In order to avoid side reactions, the oxidation of sodium chlorate by lead dioxide was accelerated by adding sulfuric acid directly to the initial reaction mixture. By this means, any lead perchlorate formed was precipitated immediately as lead sulfate and virtually no chlorine dioxide was evolved. The equation for this reaction was:

(5) $\text{NaClO}_3 + \text{PbO}_2 + \text{H}_2\text{SO}_4 \xrightarrow{\text{HClO}_4} \text{NaClO}_4 + \text{PbSO}_4 + \text{H}_2\text{O}$ In this experiment, 0.3 mole of sodium chlorate, 0.3 mole of lead dioxide, 0.9 mole of perchloric acid (100% basis) and 0.3 mole of sulfuric acid (100% basis) were reacted at 100° C. for two hours. Only 0.8 percent of the sodium chlorate was lost and the conversion of sodium chlorate to sodium perchlorate was 90 percent.

My invention is also applicable to the conversion of potassium chlorate to potassium perchlorate by using an equivalent amount of potassium chlorate for the sodium chlorate in the process heretofore described.

*Table 1*

SUMMARY OF SEVEN CYCLES OF LEAD DIOXIDE PROCESS FOR SODIUM PERCHLORATE

| | Cycle I | | | Cycle II | | | Cycle III | | |
|---|---|---|---|---|---|---|---|---|---|
| | Crystals | First Wash+ liquor | Residue wash | Crystals | First Wash+ liquor | Residue wash | Crystals | First Wash+ liquor | Residue wash |
| Charge (moles): | | | | | | | | | |
| NaClO₃ | 0.50 | | | 0.50 | | | 0.50 | | |
| NaClO₄ | | | | | 0.10 | | | 0.13 | |
| HClO₄ | | 1.50 | | | 1.50 | | | 1.50 | |
| H₂SO₄ | | 0.50 | | | 0.50 | | | 0.50 | |
| PbO₂ | 0.50 | | | 0.50 | | | 0.50 | | |
| Products (moles): | | | | | | | | | |
| NaClO₃ | 0.00 | 0.01 | 0.00 | 0.00 | 0.03 | 0.00 | 0.00 | 0.03 | 0.00 |
| NaClO₄ | 0.33 | 0.09 | 0.03 | 0.48 | 0.14 | 0.02 | 0.36 | 0.20 | 0.02 |
| HClO₄ | 0.03 | 1.17 | 0.08 | 0.13 | 1.37 | 0.01 | 0.03 | 1.35 | 0.04 |
| H₂SO₄ | 0.00 | 0.00 | 0.00 | 0.00 | 0.00 | 0.00 | 0.00 | 0.00 | 0.00 |
| Residue (moles): | | | | | | | | | |
| PbO₂ | | | not anal. | | | not anal. | | | 0.017 |

Table I—Continued

| | Cycle IV | | | Cycle V | | | Cycle VI | | | Cycle VII | | |
|---|---|---|---|---|---|---|---|---|---|---|---|---|
| | Crystals | First Wash+ liquor | Residue wash | Crystals | First Wash+ liquor | Residue wash | Liquor | Wash | Residue wash | Liquor | Wash | Residue |
| Charge (moles): | | | | | | | | | | | | |
| NaClO₃ | 0.50 | | | 0.50 | | | 0.48 | | | 0.5000 | | |
| NaClO₄ | | 0.21 | | | 0.12 | | 0.17 | | | 0.2001 | | |
| HClO₄ | | 1.51 | | | 1.49 | | 1.53 | | | 1.5151 | | |
| H₂SO₄ | | 0.50 | | | 0.50 | | 0.60 | | | 0.5952 | | |
| PbO₂ | 0.50 | | | 0.50 | | | 0.60 | | | 0.6001 | | |
| Products (moles): | | | | | | | | | | | | |
| NaClO₃ | 0.00 | 0.00 | 0.00 | 0.00 | 0.02 | 0.00 | 0.000 | 0.000 | | 0.0000 | 0.0068 | |
| NaClO₄ | 0.41 | 0.06 | 0 02 | 0.50 | 0.18 | 0.01 | 0.278 | 0.248 | | 0.4308 | 0.2334 | 0.0169 |
| HClO₄ | 0.06 | 1.33 | 0.05 | 0.05 | 1.42 | 0.04 | 1.029 | 0.545 | | 1.0018 | 0.4779 | 0.0176 |
| H₂SO₄ | 0.00 | 0.00 | 0.00 | 0.00 | 0.00 | 0.00 | 0.083 | 0.05 | | 0.0426 | 0.0230 | |
| Residue (moles): | | | | | | | | | | | | |
| PbO₂ | | | 0.018 | | | 0.016 | | | 0.151 | | | 0.0927 |

I claim:

1. In the oxidation of sodium chlorate with lead dioxide in an aqueous sulfuric acid reaction mixture, the step of including in such mixture as an initial reactant at least a molar amount of perchloric acid, based upon the moles of sodium chlorate present.

2. A process which comprises reacting an aqueous mixture comprising essentially one mole of sodium chlorate, 0.8 to 1.5 moles of lead dioxide, 0.8 to 2 moles of sulfuric acid and 2 to 5 moles of perchloric acid to form sodium perchlorate, the amount of water in said mixture being within the range of 57 to 77% of the combined weight of said acids.

No references cited.